United States Patent
Prete et al.

(10) Patent No.: US 11,649,563 B2
(45) Date of Patent: May 16, 2023

(54) USE OF 4-BORA-3A,4A-DIAZA-S-INDACENES FOR THE PRODUCTION OF FLUORESCENT FIBRES

(71) Applicant: CRIME SCIENCE TECHNOLOGY, Loos (FR)

(72) Inventors: Cosimo Prete, Villeneuve d'Ascq (FR); Alexis Depauw, Gif sur Yvette (FR); Jeremy Malinge, Le Mesnil Saint Denis (FR)

(73) Assignee: CRIME SCIENCE TECHNOLOGY, Loos (FR)

( * ) Notice: Subject to any disclaimer, the term of this patent is extended or adjusted under 35 U.S.C. 154(b) by 665 days.

(21) Appl. No.: 16/609,868

(22) PCT Filed: May 2, 2018

(86) PCT No.: PCT/FR2018/051091
§ 371 (c)(1),
(2) Date: Oct. 31, 2019

(87) PCT Pub. No.: WO2018/202996
PCT Pub. Date: Nov. 8, 2018

(65) Prior Publication Data
US 2020/0080235 A1    Mar. 12, 2020

(30) Foreign Application Priority Data
May 2, 2017 (FR) ...................... 17 53837

(51) Int. Cl.
| | |
|---|---|
| D01F 1/06 | (2006.01) |
| B42D 25/36 | (2014.01) |
| C07F 5/02 | (2006.01) |
| C09B 57/00 | (2006.01) |
| C09K 11/02 | (2006.01) |
| C09K 11/06 | (2006.01) |
| D06P 1/00 | (2006.01) |

(52) U.S. Cl.
CPC ............... *D01F 1/06* (2013.01); *B42D 25/36* (2014.10); *C07F 5/022* (2013.01); *C09B 57/00* (2013.01); *C09K 11/02* (2013.01); *C09K 11/06* (2013.01); *D06P 1/0012* (2013.01); *C09K 2211/1018* (2013.01); *C09K 2211/1022* (2013.01); *D10B 2401/20* (2013.01)

(58) Field of Classification Search
CPC ......... D01F 1/06; D06P 1/0012; C09K 11/06; C09K 2211/1018; C09K 2211/1022
See application file for complete search history.

(56) References Cited

U.S. PATENT DOCUMENTS

| | | | | |
|---|---|---|---|---|
| 5,189,029 A | * | 2/1993 | Boyer | ............... A61K 31/69 514/64 |
| 2013/0215598 A1 | | 8/2013 | Guzan et al. | |
| 2018/0030210 A1 | | 2/2018 | Leistner et al. | |

FOREIGN PATENT DOCUMENTS

| | | |
|---|---|---|
| CN | 1412355 A | 4/2003 |
| CN | 105862451 A | 8/2016 |
| CN | 106349261 A | 1/2017 |
| EP | 0169750 A1 | 1/1986 |
| EP | 0708935 A1 | 5/1996 |
| JP | 2016-119458 A | 6/2016 |
| WO | 03/054259 A1 | 7/2003 |
| WO | 2010086522 A1 | 8/2010 |
| WO | 2011/110275 A2 | 9/2011 |
| WO | 2016/155695 A1 | 10/2016 |

OTHER PUBLICATIONS

Oliver Galangau et al; "Rational design of visible and NIR distryryl-BODIPY dyes from a novel fluorinated platform"; Organic & Biomolecular Chemistry; www.rsc.org/obc; Aug. 17, 2010; vol. 8; Issue 20; pp. 4546-4553.*
Sophie Badré et al.; Fluorescence of molecular micro- and nanocrystals prepared with Bodipy derivatives; ScienceDirect; Journal of Photochemistry and Photobiology A:Chemistry, vol. 183; Issue 3; Elsevier; Jul. 11, 2006; pp. 238-246.*
Mu et al, "Facile electrospinning preparation and superior luminescence properties of BODIPY composite nanofibers", Textile Research Journal, vol. 87(15), pp. 1795-1805, pub. online—Jul. 26, 2016.*
Balachandran et al, "Photonic textile fibers", Applied Optics, vol. 35, No. 12, Apr. 20, 1996, pp. 1991-1994.*
Shankarling et al, "Laser Dyes", Resonance, 9/10, pp. 804-818.*
First Chinese Office Action dated Dec. 24, 2021, in corresponding to Chinese Application No. 2018800334831; 20 pages (with English Translation).
Olivier Galangau et al.; "Rational design of visible and NIR distryryl-BODIPY dyes from a novel fluorinated platform"; Organic & Biomolecular Chemistry; www.rsc.org/obc; Aug. 17, 2010; vol. 8; Issue 20; pp. 4546-4553.

(Continued)

Primary Examiner — C Melissa Koslow
(74) Attorney, Agent, or Firm — Maier & Maier, PLLC

(57) ABSTRACT

Compounds for use in the textile field, and more particularly the use of compounds of the 4-bora-3a,4a-diaza-s-indacene family for the manufacture of fluorescent fibers, the fluorescent compound being chosen from those of formula I:

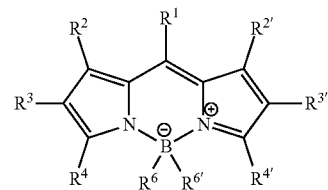

Also, processes for producing the fluorescent fibers and also to the uses thereof, notably for the provision of security to products.

4 Claims, No Drawings

(56) References Cited

OTHER PUBLICATIONS

Indian Office Action dated Feb. 3, 2022, in corresponding to Indian Application No. 201917047227; 6 pages (with English Translation).
Armin Burghart et al.; "3,5-Diaryl-4,4-difluoro-4-bora-3a,4a-diaza-s-indacene (BODIPY) Dyes: Synthesis, Spectroscopic, Electrochemical, and Structural Properties"; Sep. 30, 1999; Abstract Only.
Melek Pamuk Alg; "Design and synthesis of new 4,4-difluoro-4-bora-3a,4a-diaza-s-indacene based electrochromic polymers"; Abstract Only.
Ulrich et al. "A General Synthetic Route to 3,5-Substituted Boron Dipyrromethenes: Applications and Properties." The Journal of Organic Chemistry. Vol. 77. Apr. 12, 2012. pp. 4298-4311.
English translation of Russian Office Action completed on Aug. 25, 2021, in connection with corresponding RU Application No. 2019138441; 7 pages.
Translation of International Search Report and Written Opinion dated Jul. 31, 2018 in corresponding application No. PCT/FR2018/051091; 10 pgs.

* cited by examiner

USE OF 4-BORA-3A,4A-DIAZA-S-INDACENES FOR THE PRODUCTION OF FLUORESCENT FIBRES

FIELD

The present invention relates to the textile field, and more particularly concerns the use of compounds of the 4-bora-3a,4a-diaza-s-indacene family for the manufacture of fluorescent fibers, to processes for obtaining same and to the uses thereof, notably for the provision of security to products.

BACKGROUND

Nowadays, counterfeiting and forgery are increasing substantially in many sectors, notably those with high added value. An increasing number of products are liable to be counterfeited and no sector seems to be spared.

In this context, it is necessary to continually provide novel means for effectively combating falsification, all the more so given that this falsification may also affect fiduciary documents, for instance banknotes, or identity documents.

In the field of the provision of security to products and notably to fiduciary or identity documents, various companies provide visual authentication solutions, for example by means of holograms or laser etchings, which may make it possible to insert information onto the polycarbonate card body, such as identity cards, health cards or driving licenses. Patent application EP 0 708 935 thus describes a holographic protection layer assembly. This assembly is constituted of a support film having at least one layer formed by a protective varnish, a reflective or transparent layer bearing the diffracting microstructure, and finally an adhesive layer. Once the assembly has been transferred onto a document, provision of security to said document is obtained.

Thereafter, this system was improved in patent application WO 2010/086522 via the addition of perforations in order to make it more difficult to separate the various layers. It nevertheless remains that the assembly is constituted by a plurality of parts that it is necessary to assemble and now to perforate, which represents not only technical constraints but also time and cost constraints.

With the development of information technology, the provision of security to identity or fiduciary documents has also been reinforced via the incorporation of electronic elements, such as chips, thus making falsification more difficult.

In general, products or documents are rendered secure by means of security elements which may be classified in three levels of security as a function of the means used for detection.

Thus, level-1 security elements are elements that can be detected by at least one of the five senses or by means of a contrasted background. This level notably includes guillloches, optical variability devices such as rainbow prints, holograms, optically variable inks, markers, changeable laser images or multiple laser images.

Level-2 security elements are elements that can be detected by means of simple equipment such as an ultraviolet lamp, a convex lens or a cell phone flashlight. This level includes detectable elements such as micro-prints, fluorescent inks, and also fluorescent fibers or wafers.

Finally, level-3 security elements are elements that can be detected by means of sophisticated equipment, for instance a spectrofluorimeter or an electron microscope. This category notably includes nano-engraved pigments, biometric chips and also fluorescent markers that are not detectable to the naked eye (taggants).

Still in general, a product may incorporate several security elements, said elements possibly being of different levels.

In the field of fiduciary or identity documents, a security element is commonly present; this notably concerns security threads.

Generally, the security threads that are available on the market are level-2 and/or level-3 security elements, which may pose limitations in terms of ease of detection.

Security threads are incorporated into the documents to be rendered secure and may be classified in several categories:
  threads that are visible in sunlight or artificial light,
  threads that are visible in sunlight or artificial light and which exhibit fluorescence under ultraviolet rays, infrared rays or X-rays,
  threads that are invisible in sunlight or artificial light but which exhibit fluorescence under ultraviolet rays, infrared rays or X-rays. The term "threads that are invisible in sunlight or artificial light" should be understood as referring to threads which have in sunlight or artificial light a color identical to that which they had before the treatment they have undergone which has rendered them fluorescent. For example, this is the case for the whitish security threads that are incorporated into white paper pulp. These threads are then invisible or indiscernible since they have the same color as the paper; however, by means of ultraviolet rays, infrared rays or X-rays, said threads emit fluorescence in a specific color.

Security threads are generally threads onto which dyes are incorporated at the surface. Patent application EP 0 169 750 describes, for example, lanthanides, of atomic number 57 to 71, among which may be included yttrium and thorium of atomic number 39 and 90, respectively. Luminescent chelates of lanthanides, yttrium or thorium are incorporated into threads that have already been extruded and chopped, via a dyeing process.

The dyeing processes may be performed via methods of soaking the material in baths of dye in the presence of solvent. However, this technique does not make it possible to provide security to the material directly at the core and this may result in limited performance.

In order to remedy this, the incorporation of the dye, notably for synthetic threads, may take place directly in the polymer bulk. However, the constraints associated with the forming of the materials, notably the high temperature used in the extrusion-spinning processes, drastically reduce the number of fluorescent dyes that may be used.

In order to meet an ongoing need to develop ever more efficient security elements, it would be advantageous to have available an alternative that can notably allow authentication on levels 2 and 3, but also particularly advantageously on level 1 so as to obtain intuitive, rapid and efficient controlling of the fiduciary or identity document. Advantageously, the alternative solutions should also be able to be used for a multitude of other products, for instance textile products, in order to permit the provision of security.

The inventors have thus, to their credit, developed particular fluorescent compounds that notably allow use in the field of providing security so as to manufacture fibers that can be detected on the three security levels described previously, said fibers being readily detectable and making it possible notably to provide security to a wide range of products, not only identity or fiduciary documents, but also products such as textiles.

SUMMARY

A first subject of the invention relates to the use of a fluorescent compound of the 4-bora-3a,4a-diaza-s-indacene family for the manufacture of fluorescent fibers, said fluorescent compound being chosen from those of formula I:

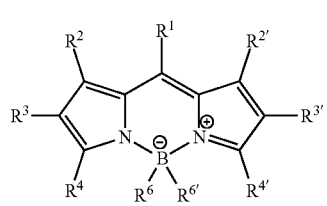

wherein:

$R^2$ is C1 to C6 alkyl, C5 to C6 cycloalkyl, C5 to C6 heteroalkyl, phenyl, said phenyl group being optionally substituted with one or more groups chosen from C1 to C2 alkyl, hydroxyl, $R^5COO^-$ and halogen;

$R^2$ and $R^{2'}$ are independently chosen from hydrogen and C1 to C2 alkyl;

$R^3$ and $R^{3'}$ are independently chosen from hydrogen, aryl, heteroaryl, cycloalkyl, alkyl, alkenyl and alkynyl, said aryl, heteroaryl, cycloalkyl, alkyl, alkenyl and alkynyl being optionally substituted with one or more groups chosen from C1 to C4 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;

$R^4$ and $R^{4'}$ are independently chosen from aryl, heteroaryl, cycloalkyl, alkyl, alkenyl and alkynyl, said aryl, heteroaryl, cycloalkyl, alkyl and alkenyl being optionally substituted with one or more groups chosen from C1 to C3 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;

$R^5$ is C1 to C4 alkyl or C2 to C4 alkenyl;

$R^6$ and $R^{6'}$ are independently chosen from halogens, C1 to C4 alkyl, C2 to C4 alkynyl, C2 to C4 alkenyl and aryl, said aryl being optionally substituted with one or more groups chosen from C1 to C2 alkyl, hydroxyl, $R^5COO-$ and halogen.

The fluorescent compounds according to the invention are found to be particularly advantageous for the production of fluorescent fibers and have good properties allowing their uses for producing both synthetic fluorescent fibers and natural fluorescent fibers. The fibers according to the invention may thus be advantageously intended for the provision of security to products such as identity or fiduciary documents or textiles, but not only. Specifically, they may also be incorporated into any other material or product in order to ensure identification thereof and the provision of security thereto. Furthermore, by virtue of the fluorescence properties, the fibers according to the invention may find a quite particular application in the decorative and esthetic field for manufacturing objects with improved esthetic properties.

A second and third subject of the invention concern, respectively, processes for manufacturing synthetic fluorescent fibers and natural fluorescent fibers from fluorescent compounds of the 4-bora-3a,4a-diaza-s-indacene family.

A fourth subject of the invention concerns the use of the fluorescent fibers described previously for the provision of security to products, and notably for the provision of security to fiduciary or identity documents, or to textile products. The fluorescent fibers according to the invention prove to be a particularly innovative solution for the provision of security to fiduciary documents or to textile products and make it possible notably to obtain level 1 security, which is a true guarantee of rapid and efficient authentication.

A fifth subject of the invention concerns the use of fluorescent fibers as described previously as a decorative and/or esthetic element in a product. Specifically, by virtue of the fluorescence properties, the fibers according to the invention give improved visual properties to the products incorporating them.

Finally, a sixth subject of the invention concerns a fluorescent fiber comprising a fluorescent compound of the 4-bora-3a,4a-diaza-s-indacene family as defined below.

DETAILED DESCRIPTION

A first subject of the invention thus relates to the use of a fluorescent compound of the 4-bora-3a,4a-diaza-s-indacene family for the manufacture of fluorescent fibers, said fluorescent compound being chosen from those of formula I:

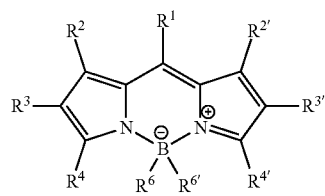

wherein:

$R^1$ is C1 to C6 alkyl, C5 to C6 cycloalkyl, C5 to C6 heteroalkyl, phenyl, said phenyl group being optionally substituted with one or more groups chosen from C1 to C2 alkyl, hydroxyl, $R^5COO^-$ and halogen;

$R^2$ and $R^{2'}$ are independently chosen from hydrogen and C1 to C2 alkyl;

$R^3$ and $R^{3'}$ are independently chosen from hydrogen, aryl, heteroaryl, cycloalkyl, alkyl, alkenyl and alkynyl, said aryl, heteroaryl, cycloalkyl, alkyl, alkenyl and alkynyl being optionally substituted with one or more groups chosen from C1 to C4 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;

$R^4$ and $R^{4'}$ are independently chosen from aryl, heteroaryl, cycloalkyl, alkyl, alkenyl and alkynyl, said aryl, heteroaryl, cycloalkyl, alkyl and alkenyl being optionally substituted with one or more groups chosen from C1 to C3 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;

$R^5$ is C1 to C4 alkyl or C2 to C4 alkenyl;

$R^6$ and $R^{6'}$ are independently chosen from halogens, C1 to C4 alkyl, C2 to C4 alkynyl, C2 to C4 alkenyl and aryl, said aryl being optionally substituted with one or more groups chosen from C1 to C2 alkyl, hydroxyl, $R^5COO-$ and halogen.

Preferred fluorescent compounds of formula I are those in which one or more from among $R^1$, $R^2$, $R^{2'}$, $R^3$, $R^{3'}$, $R^4$, $R^{4'}$, $R^5$, $R^6$ and $R^{6'}$ are defined as follows:

$R^1$ is a phenyl substituted with one or more groups chosen from methyl, fluoro, hydroxyl, acetyl and methacrylate, preferably from methyl, fluoro, hydroxyl and acetyl and more preferably from methyl or fluoro;

$R^2$ and $R^{2'}$ are independently chosen from hydrogen and a methyl;

$R^3$ and $R^{3'}$ are independently chosen from hydrogen, C1 to C3 alkyl, vinyl, aryl, heteroaryl, adamantyl, said vinyl and aryl being optionally substituted with one or more groups chosen from phenyl, C1 to C2 alkyl, said phenyl being optionally substituted with one or more groups chosen from C1 to C2 alkyl, hydroxyl, bromo, nitro, dimethylamine, preferably hydrogen, methyl, ethyl, n-propyl, vinyl, aryl, heteroaryl, adamantyl, said vinyl and aryl being optionally substituted with one or more groups chosen from phenyl, C1 to C2 alkyl, said phenyl being optionally substituted with one or more groups chosen from C1 to C2 alkyl, hydroxyl, bromo, nitro, dimethylamine, more preferably, $R^3$ and $R^{3'}$ are independently chosen from ethyl, n-propyl, methyl, vinyl, phenyl, phenanthryl, naphthyl, pyrenyl, thiophenyl, benzofuryl, said vinyl, aryl and naphthyl being optionally substituted with one or more methyl, hydroxyl, bromo, nitro and dimethylamino;

$R^4$ and $R^{4'}$ are independently chosen from methyl, vinyl, aryl, heteroaryl, adamantyl, said vinyl and aryl being optionally substituted with one or more groups chosen from phenyl, C1 to C2 alkyl, said phenyl being optionally substituted with one or more groups chosen from C1 to C2 alkyl, hydroxyl, bromo, nitro, dimethylamine, preferably, $R^4$ and $R^{4'}$ are independently chosen from methyl, vinyl, phenyl, phenanthryl, naphthyl, pyrenyl, thiophenyl, benzofuryl, said vinyl, aryl and naphthyl being optionally substituted with one or more methyl, hydroxyl, bromo, nitro and dimethylamino;

$R^5$ is methyl or ethenyl;

$R^6$ and $R^{6'}$ are independently chosen from fluoro, C1 to C4 alkyl, C2 to C4 alkynyl, C2 to C4 alkenyl or aryl, said aryl being optionally substituted with one or more groups chosen from C1 to C2 alkyl, hydroxyl, $R^5COO-$ and halogen; preferably, $R^6$ and $R^{6'}$ are fluoro.

Particularly preferred fluorescent compounds of formula I are those of table 1 below:

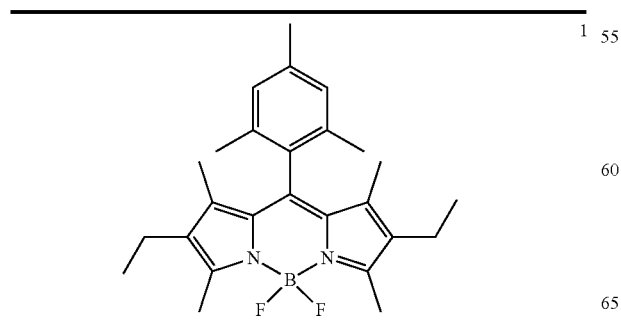

1

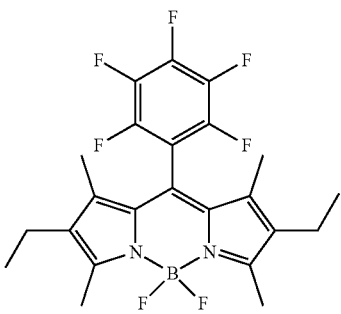

2

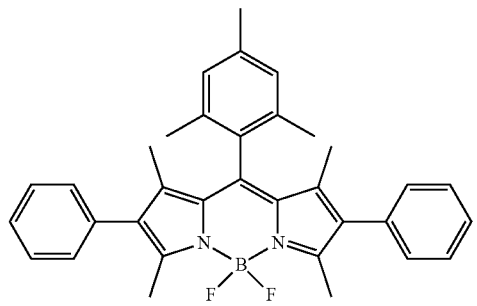

3

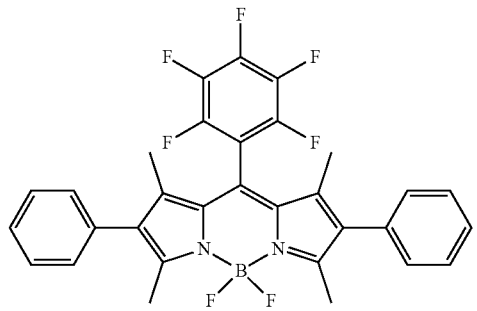

4

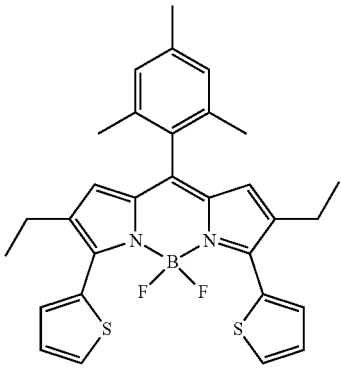

5

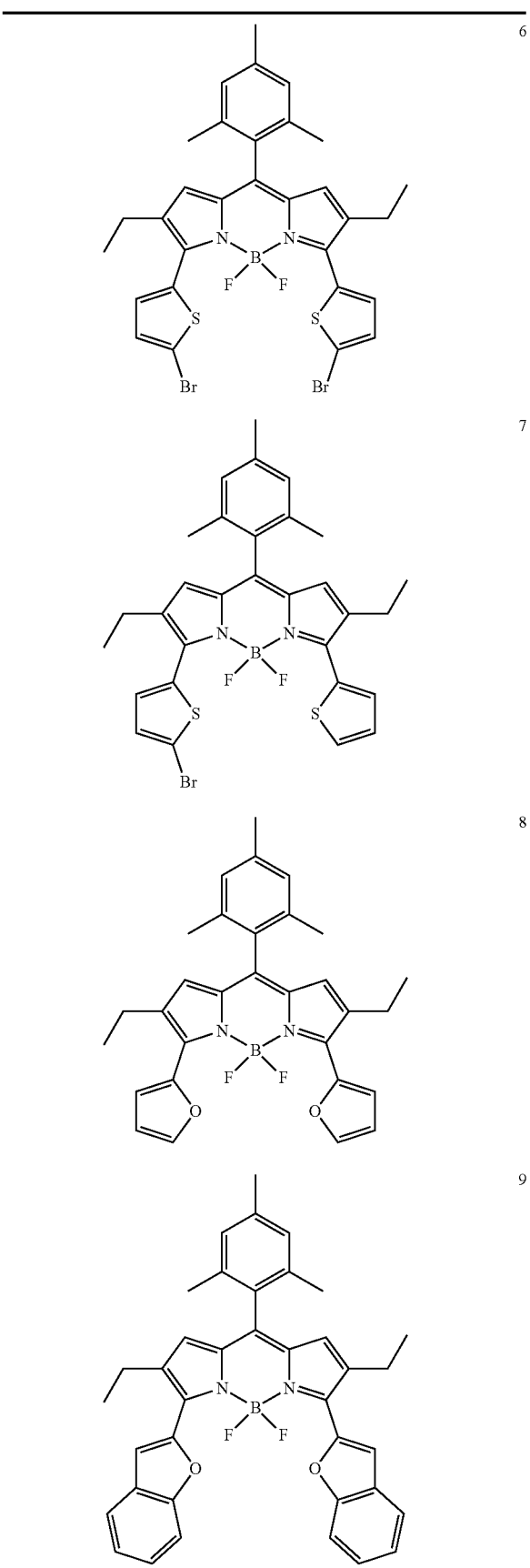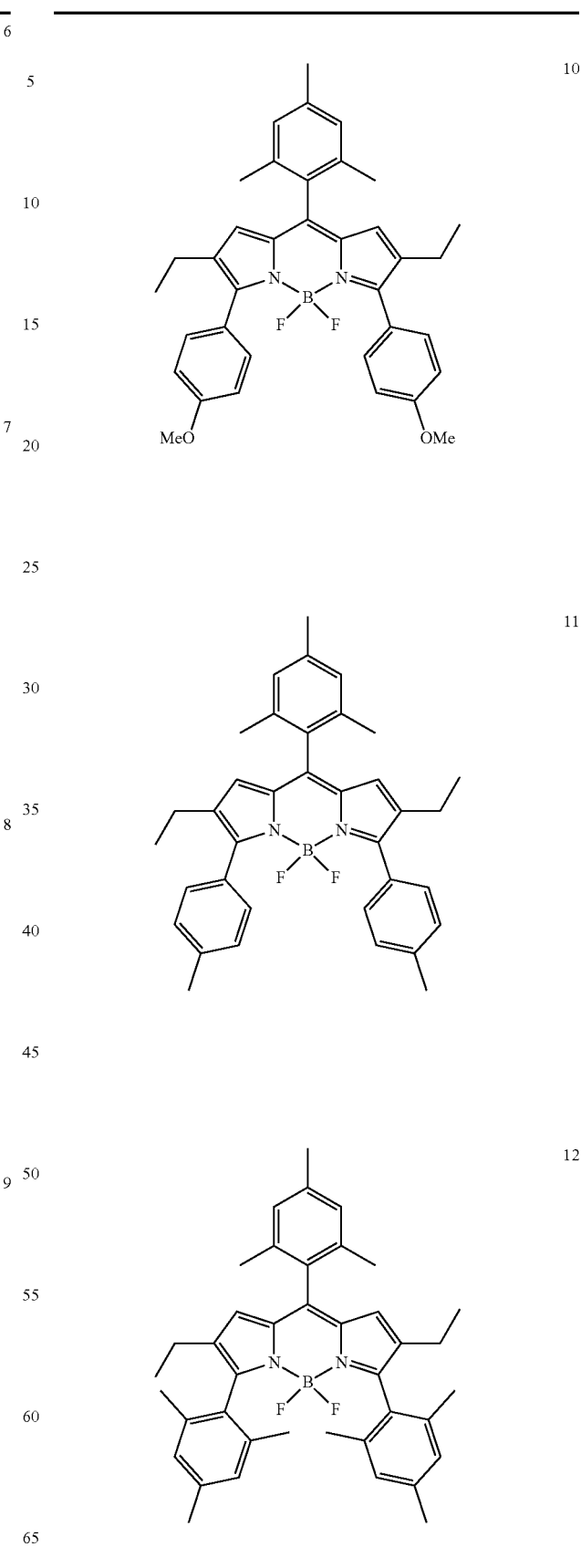

13
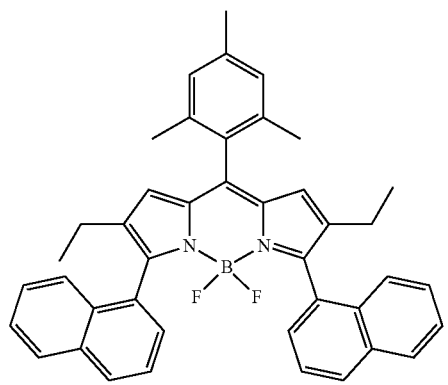
14
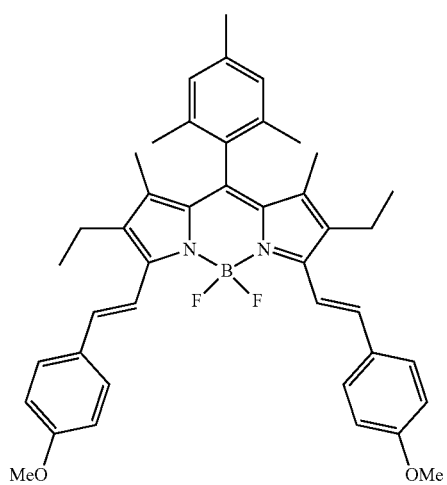
15
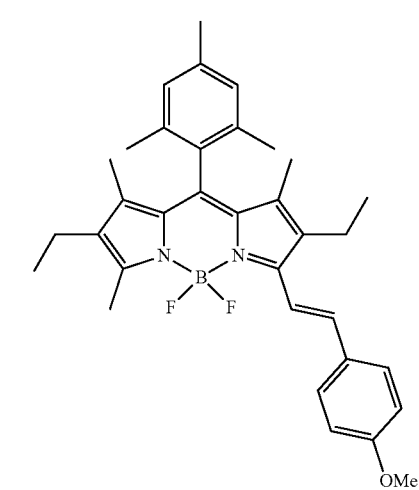
16
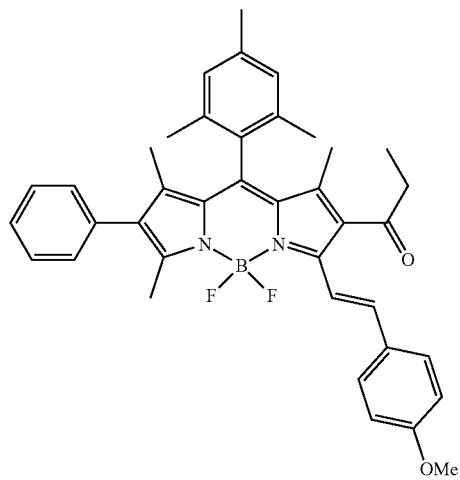
17
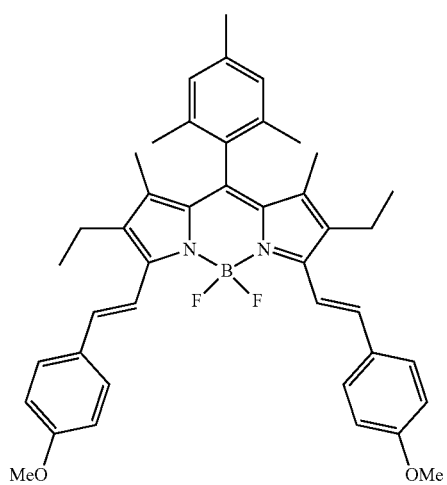
18
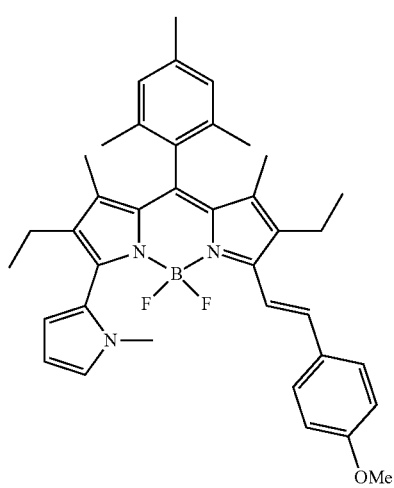

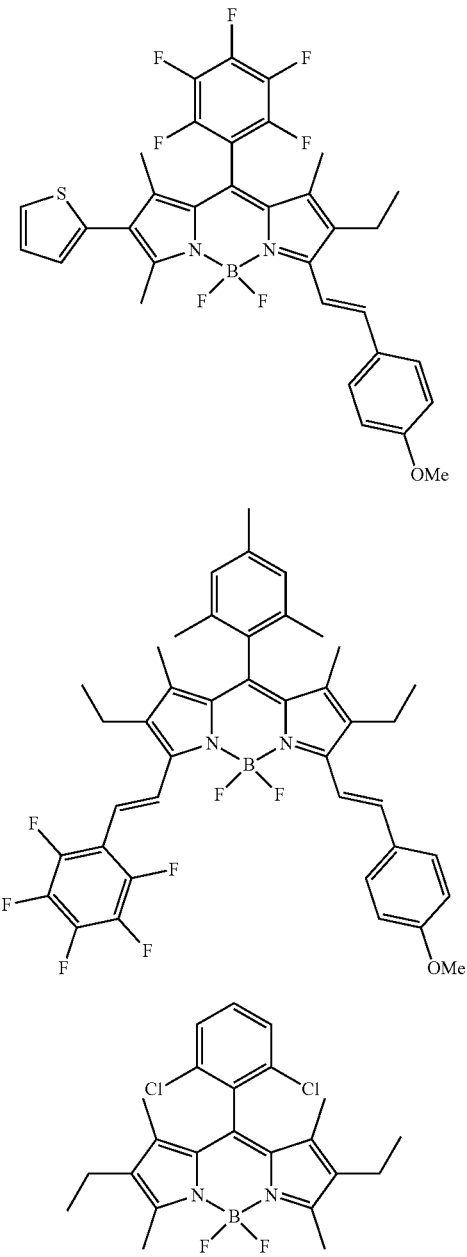

For the purposes of the present invention, the term "fluorescent fibers" means fibers which, via the introduction of particular compounds, have specific properties that they would not be able to obtain in the absence of said compounds, said properties being particularly advantageous for providing security. Typically, in the context of the present invention, the specific properties notably concern fluorescence.

The terms "fluorescent compound(s)" and "compound(s) of the 4-bora-3a,4a-diaza-s-indacene family" are considered as synonymous, except when the context makes it possible to deduce the contrary.

As used in the present invention, the term "fibers" is synonymous with the terms "filaments" and "yarns", and thus includes continuous or discontinuous monofilaments or multifilaments, multifilaments that are not twisted or entangled and base yarns. Fluorescent yarns or fluorescent fibers will thus be spoken of interchangeably.

For the purposes of the present invention, the term "product(s)" denotes not only identity or fiduciary documents, but also any product that may notably comprise fibers, for instance textile products or leathercraft articles. Preferably, according to the invention, the products are identity or fiduciary documents or textile products.

Also in general, in the present invention, the indefinite article "a" should be considered as a generic plural (meaning "at least one" or "one or more"), except where the context shows the contrary (1 or "only one"). Thus, for example, when it is stated above that the invention concerns the use of a compound of the 4-bora-3a,4a-diaza-s-indacene family for the manufacture of a fluorescent fiber, it should be understood that one or more compounds of the 4-bora-3a, 4a-diaza-s-indacene family may be used.

For the description of the fluorescent compounds used in the present invention, the terms and expressions used must, unless otherwise indicated, be interpreted according to the definitions below.

The term "halogen" denotes fluoro, chloro, bromo or iodo. Preferred halogen groups are fluoro and bromo, fluoro being particularly preferred.

The term "alkyl" denotes a linear or branched hydrocarbon radical of formula $C_nH_{2n+1}$, in which n is an integer greater than or equal to 1. The preferred alkyl groups are linear or branched C1 to C6 alkyl groups.

The term "alkenyl" denotes a linear or branched unsaturated alkyl group, comprising one or more carbon-carbon double bonds. Suitable alkenyl groups comprise from 2 to 6 carbon atoms, preferably from 2 to 4 carbon atoms and even more preferentially 2 or 3 carbon atoms. Nonlimiting examples of alkenyl groups are ethenyl (vinyl), 2-propenyl (allyl), 2-butenyl and 3-butenyl, ethenyl and 2-propenyl being preferred.

The term "alkynyl" denotes a linear or branched unsaturated alkyl group, comprising one or more carbon-carbon triple bonds. Suitable alkynyl groups comprise from 2 to 6 carbon atoms, preferably from 2 to 4 carbon atoms and even more preferentially 2 or 3 carbon atoms. Nonlimiting examples of alkynyl groups are ethynyl, 2-propynyl, 2-butynyl and 3-butynyl, ethynyl and 2-propynyl being preferred.

The term "cycloalkyl", alone or as part of another group, denotes a saturated monocyclic, bicyclic or tricyclic hydrocarbon radical containing 3 to 12 carbon atoms, notably 5 to 10 carbon atoms, more particularly 6 to 10 carbon atoms. Suitable cycloalkyl radicals comprise, without being limited thereto, cyclopentyl, cyclohexyl, norbornyl and adamantyl, notably cyclohexyl and adamantyl. Preferred cycloalkyl groups comprise cyclohexyl, 1-adamantyl and 2-adamantyl.

The term "aryl" denotes an aromatic polyunsaturated hydrocarbon radical, which is monocyclic (for example phenyl) or polycyclic (for example naphthyl, anthracenyl, phenanthryl or pyrenyl). Preferred aryl groups comprise phenyl, naphthyl, anthracenyl, phenanthryl and pyrenyl.

The term "heteroaryl" denotes an aromatic ring containing from 5 to 12 carbon atoms in which at least one carbon atom is replaced with an oxygen, nitrogen or sulfur atom or with —NH, which nitrogen and sulfur atoms may be optionally oxidized and which nitrogen atom may be optionally quaternized, or a ring system containing 2 to 3 fused rings each typically containing 5 or 6 atoms and at least one ring of which is aromatic, at least one carbon atom of the at least one aromatic ring being replaced with an oxygen, nitrogen or sulfur atom or with —NH, which nitrogen and sulfur atoms may be optionally oxidized and which nitrogen atom may be optionally quaternized. Examples of heteroaryl groups comprise furyl, thiophenyl, pyrrolyl, pyridyl and benzofuryl.

The 4-bora-3a,4a-diaza-s-indacene compounds are fluorescent dyes, the first synthesis of which was published in 1968 (A. Treibs et al., Justus Liebigs Ann. Chem. 1968, 718, 208). Since then, several other syntheses have been published (for example: Chem. Eur. J., 2009, 15, 5823; J. Phys. Chem. C, 2009, 113, 11844; Chem. Eur. J., 2011, 17, 3069; J. Phys. Chem. C, 2013, 117, 5373) and numerous 4-bora-3a,4a-diaza-s-indacene compounds are commercially available, for example from ThermoFisher Scientific (Waltham, Mass. USA).

They have noteworthy absorption and emission properties and notably have relatively narrow excitation and fluorescent emission bands with high quantum yields $\phi$ of between 0.5 and 1, which makes them highly fluorescent. Furthermore, these compounds have good photostability and also substantial heat stability. Specifically, the fluorescent compounds according to the invention are generally stable up to temperatures of about 300° C. By virtue of this substantial heat stability, these fluorescent compounds may readily be incorporated into polymer matrices in melt form and, contrary to all expectation, the performance qualities in terms of absorption and fluorescence emission are not impaired by the incorporation into a polymer matrix.

The use of a 4-bora-3a,4a-diaza-s-indacene compound for the manufacture of fluorescent fibers is particularly noteworthy. Specifically, the fluorescent fibers thus obtained may have a multitude of applications and notably security applications.

Advantageously, the fluorescent fibers are used for the provision of security to products. Thus, a product rendered secure with the aid of the fluorescent fibers according to the invention is a product comprising said fibers. As a result, by means of the presence of the fluorescent fibers, the product will be able to be authenticated by virtue of the unique combination of the absorbed color and of the specific fluorescence of the fluorescent compounds contained in the fluorescent fibers. Thus, only an authentic product will have both the correct absorption and fluorescence emission properties.

Products comprising the fluorescent fibers according to the invention may thus be authenticated on the three security levels described hereinabove by virtue of the sole presence of the 4-bora-3a,4a-diaza-s-indacene compound(s). To the inventors' knowledge, this is the first time that a fluorescent fiber allows such multi-level provision of security.

Specifically, 4-bora-3a,4a-diaza-s-indacene compounds all have an absorption band in the visible range and the color perceived by the naked eye will correspond to the complementary color to the color absorbed. For example, a compound absorbing at about 500-520 nm, which corresponds to a green/blue color, will appear to the naked eye in orange/red tones. This property thus makes it possible to obtain level-1 security elements.

As regards the fluorescence properties, the compounds of the 4-bora-3a,4a-diaza-s-indacene family according to the invention all have excitation bands at least in the ultraviolet (UV) range and emission bands in the visible range. They can thus be excited notably by means of a UV lamp emitting at between 100 nm and 400 nm and the fluorescence will be able to be detected with the naked eye, which makes it possible to obtain level-2 security elements.

Finally, the emission wavelength will be able to be determined with the aid of a single-network low-resolution spectrofluorimeter or fluorimeter (detection by photodiode or photomultiplier tube), which gives the fluorescent fibers according to the present invention level 3 security.

Thus, products rendered secure with the fluorescent fibers according to the present invention are detectable on the three levels by means of the combination of the absorption and fluorescence properties. In this context, the fluorescent fibers according to the invention may thus be considered as security elements.

For the purposes of the present invention, authentication is understood as being the verification of the authenticity of a product via the detection of the fluorescent fibers that are incorporated therein. Detection of the presence or absence of coloring or of fluorescence thus makes it possible to authenticate or otherwise the product under consideration.

According to a first embodiment of the invention, the fluorescent compounds are used for manufacturing synthetic fluorescent fibers.

A synthetic fiber is a fiber produced from synthetic materials which may be obtained by synthesis of chemical compounds. Preferentially, the synthetic fibers are fibers constituted essentially of polymer.

Thus, for the purposes of the present invention, a synthetic fluorescent fiber may thus be a fluorescent fiber constituted essentially of polymer, said polymer incorporating a fluorescent compound as defined previously.

The use of the fluorescent compounds for the manufacture of synthetic fluorescent fibers is advantageous since said compounds can readily be incorporated into the polymers conventionally used for the manufacture of synthetic fibers and are above all entirely compatible with the spinning processes known to those skilled in the art.

The term "incorporated" means that one or more 4,4-difluoro-4-bora-3a,4a-diaza-s-indacene compounds are intimately integrated into the polymer so as to form a homogeneous mixture, not showing any dispersion. The integration of the fluorescent compound into the polymer may be achieved in various ways according to the techniques known to those skilled in the art. Advantageously, the inventors have found that the incorporation did not impair either the performance qualities of the polymer, or those of the actual fluorescent compound. Specifically, the inventors have found that the fluorescent compounds used according to the invention are particularly stable and do not degrade when they are incorporated into the polymer, even when the incorporation processes require the use of high temperatures. The fluorescent compounds thus maintain their fluorescence properties even when the incorporation requires heating to temperatures allowing the melting of the polymer, typically, in the context of the invention, up to temperatures that may reach 310° C.

As an example of a technique for the integration of the fluorescent compound into the polymer, mention will be made of extrusion. According to this technique, the polymer may be added into the extruder in a form suitable for extrusion, for instance granules, and the fluorescent compound may be added in powder form. At the extruder outlet, a mixture of polymer incorporating the fluorescent compound is recovered, preferentially in the form of granules or rods.

The polymers used for the manufacture of the synthetic fluorescent fibers may be chosen, for example, from polycarbonate, polyester, polystyrene, polyethylene, polypropylene, polyethylene terephthalate (PET), polyacrylate, polymethacrylate, poly(vinyl chloride), polyamides, polyaramids, ethylene-vinyl acetate (EVA), polyurethane, thermoplastic polyurethane (TPU), cyanoacrylate, colophony resins, pine resins, photopolymerizable resins or mixtures thereof. Preferentially, the polymer is chosen from polyamides, polycarbonate, polyester, polypropylene, thermoplastic polyurethane and photopolymerizable resins, more preferably from polyamides, polycarbonate, polyester, polypropylene and mixtures thereof.

Advantageously, the polymer used does not contain any UV-stabilizing additive so as to allow optimum maintenance of the fluorescence properties.

According to this first embodiment, the fluorescent compound may thus be integrated into the polymer so as to obtain a homogeneous mixture, said mixture then being able to be formed into fibers according to the techniques known to those skilled in the art.

Specifically, since the fluorescent compound is integrated into the polymer, the mixture obtained may be formed via the techniques conventionally used for obtaining fibers, said fibers possibly being, without preference, woven or nonwoven fibers. Preferentially, the synthetic fluorescent fibers are manufactured via the melt-spinning method, via an extrusion-spinning process.

The manufacture of fibers via the melt-spinning method consists first in melting the mixture of polymer and of fluorescent compound in an extruder. The molten material is then passed under pressure through a die constituted of a multitude of heads. At the die outlet, the filaments are air-cooled, drawn and then wound on a support. Generally, a sizing product may be applied to the bottom part of the spinning tower.

The form of the fluorescent fiber obtained according to the extrusion-spinning processes may notably be determined by the form of the die heads. Thus, according to the invention, the synthetic fluorescent fibers may notably have a cylindrical, trilobal, octalobal, hollow or multiple hollow form.

Modification of the form of the fluorescent fibers may be advantageous in the sense that it makes it possible to modify the visual effects at the macroscopic scale. Specifically, discontinuity of a section or of the refractive index of light in the fiber can modify the transmission of light and thus the effects observed at the macroscopic scale.

According to a particular embodiment, discontinuity of the refractive index of light may be achieved by adding a compound, such as a polymer, having a texture and/or properties different from those of the polymer used for the integration of the fluorescent compound. According to this particular embodiment, the addition may be performed by coextrusion of said compound with the mixture obtained previously from the polymer and the fluorescent compound, before the assembly is subsequently passed through a die to produce the synthetic fluorescent fibers. By way of example, if the polymer used for the integration of the fluorescent compound is polypropylene, the polymer having a different texture and/or different properties may be polycarbonate. Still according to this particular embodiment, the addition of said compound having a texture and/or properties different from those of the polymer used for the integration of the fluorescent compound may also be performed by sheathing directly using the synthetic fluorescent fiber obtained at the extruder-spinner outlet as described previously. Discontinuity of the refractive index may also be achieved by the presence of a metallic compound, such as a metal wire, in the synthetic fluorescent fiber. Such an assembly may be obtained by sheathing the polymer integrating a fluorescent compound according to the invention around said metal wire.

According to a particular embodiment, the synthetic fluorescent fibers may undergo at least one post-treatment intended to give them particular properties. Such a post-treatment may be, for example, a coating treatment, a stain-resistant treatment, a fire-resistant treatment or a finishing.

The synthetic fluorescent fibers manufactured according to the invention may be characterized by their yarn count, the unit of which is the Tex, said yarn count corresponding to the weight of the fiber in grams per kilometer of fiber. Two parameters may influence the yarn count of a fiber, namely the feed rate of the extrusion pump which controls the amount of material exiting the die, and the rotation speed of the various drawing bobbins.

The linear mass ($\mu$) of the fiber may be calculated from the extruder-spinner characteristics and from the drawing speed of the machine according to the formula below:

$$\mu = ((dp \cdot t \cdot Vp)/Vs) \times 10000$$

in which the linear mass $\mu$ is expressed in dtex, dp corresponds to the density of the molten polymer (g/cm3), t the number of rotations of the pump, Vp the volume of the pump and Vs the speed of the last draw roll (m/min).

The fluorescent fibers according to the invention may have a linear mass $\mu$ of between 0.1 and 10 000 dtex. Thus, said fluorescent fibers may have a linear mass $\mu$ ranging from 100 to 1000 dtex, preferably a linear mass $\mu$ ranging from 100 to 700 dtex and more preferably a linear mass $\mu$ ranging from 200 to 400 dtex. Advantageously, a person skilled in the art can adapt the linear mass of the synthetic fluorescent fiber as a function of the product to be rendered secure.

The amounts of fluorescent compounds for the manufacture of the fluorescent fibers according to the invention are adapted so as to allow the detection of the absorbance and fluorescence properties. The fluorescent compounds according to the invention have the advantage of allowing detection of the properties even when they are present in very small amounts.

According to a first embodiment, detection is thus permitted even when the fluorescent compound is incorporated into the polymer in a very small amount. Specifically, amounts of fluorescent compounds ranging from 0.01% to 5% by weight relative to the total weight of the polymer are sufficient for the detection, preferentially amounts ranging from 0.01% to 2% by weight relative to the total weight of the polymer and even more preferentially amounts ranging from 0.025% to 0.1% by weight relative to the total weight of the polymer.

These small amounts notably have the advantage of avoiding the implementation problems encountered at higher concentrations, for instance the fouling of the die heads.

According to a second embodiment of the invention, the fluorescent compounds are used for manufacturing natural fluorescent fibers.

For the purposes of the present invention, the term "natural fluorescent fibers" means natural fibers which have been made fluorescent by impregnation of fluorescent compounds described previously.

The fluorescent compounds according to the invention may be used to make fluorescent any natural fiber known to a person skilled in the art in order to obtain natural fluorescent fibers. The natural fibers may thus be of plant or animal origin. By way of example, mention will be made notably of cotton, flax and hemp fibers, or alternatively sisal, kenaf or coconut fibers.

The manufacture of natural fluorescent fibers by impregnation using the fluorescent compounds according to the invention may be performed by means of techniques known to those skilled in the art.

According to a particular embodiment, the natural fluorescent fibers are manufactured by coating natural fibers with a solution comprising at least one fluorescent compound according to the invention. Said solution may be, for example, a soaking solution or a varnish bath comprising at least one fluorescent compound and which may also comprise a resin.

The solution may be obtained from organic, aqueous or aqueous-alcoholic solutions. By way of example, the solution may be based on ethyl acetate or acetone. The fluorescent compounds are present in said solution in amounts ranging from 0.01% to 5% by weight relative to the total weight of the solution, preferentially amounts ranging from 0.01% to 2% and even more preferentially in amounts ranging from 0.025% to 0.1% by weight relative to the total weight of the solution.

According to a particular embodiment, the synthetic or natural fluorescent fibers according to the invention may undergo twisting so as to be twisted yarns. According to the terms known to those skilled in the art, the twist may be a Z or S twist.

According to another particular embodiment, the synthetic or natural fluorescent fibers may be in the form of a twisted multifilament.

According to another particular embodiment, the synthetic or natural fluorescent fibers may be in the form of an assembly of multifilaments. According to this embodiment, the assembly may comprise a multifilament based on synthetic or natural fluorescent fibers according to the invention and a contrasting multifilament, for instance a black, white or metallic multifilament. Still according to this embodiment, the assembly may also comprise several multifilaments based on said fluorescent fibers, said multifilaments differing at least in the nature of the fluorescent compound used for the manufacture of the fluorescent fibers.

The synthetic or natural fluorescent fibers according to the invention are particularly advantageous and, by means of the fluorescent compounds they comprise, notably have the following optical effects:
  Tilt effect or rocker effect: This effect corresponds, by the presence of the fluorescent compound, to a change in the intrinsic color of the fiber, toward the emission of fluorescence of the fluorescent compound without external stimulation. This change in color is a function of the angle of observation of the fiber, of its cross section and of its assembly (downtwisting, sheathing, etc.). Under normal observation, the color perceived is that of the unexcited yarn, whereas under oblique observation, the color perceived is that of the fluorescence emission. This sharp color change from the color perceived with the naked eye of the fluorescent compound to its fluorescence emission without external apparatus constitutes a level 1 security.
  On/off effect: This effect corresponds to the visualization of a color change in response to stimulation of the fluorescence of the fluorescent compounds notably with a light source of LED or UV type. This constitutes a level 2 security.
  Unique spectral identity effect: the fluorescent compounds impregnated or incorporated into the polymer matrix have a unique spectral identity, notably with very fine absorption and fluorescence emission bands. Thus, when the fluorescent fibers are present on a document or a product, said document or product will be said to be rendered secure, and it is then possible, via analysis with a spectrophotometer and a spectrofluorimeter, to identify with certainty the authenticity of said document or product. This constitutes a level 3 security.

The fluorescent fibers according to the invention may correspond as a function of their specificities to the three categories defined previously, namely fibers which are visible in sunlight or artificial light, fibers which are visible in sunlight or artificial light and which have fluorescence under ultraviolet rays, infrared rays or X-rays, or else fibers which are invisible in sunlight or artificial light but which have fluorescence under ultraviolet rays, infrared rays or X-rays.

The fluorescent compounds used in the present invention may be synthesized according to methods known to those skilled in the art. Reference may be made notably to the publication by A. Loudet et al. (*Chem. Rev.* 2007, 107, 4891-4932).

A second subject of the invention concerns a process for manufacturing synthetic fluorescent fibers, comprising the following steps of:
  Providing a polymer,
  Providing a compound of the 4-bora-3a,4a-diaza-s-indacene family of formula I above,
  Incorporating said compound into said polymer so as to obtain a homogeneous mixture,
  Obtaining fluorescent fibers from the homogeneous mixture obtained in the incorporation step.

A polymer that is suitable for incorporating a compound of the 4-bora-3a,4a-diaza-s-indacene family may be chosen from polycarbonate, polyester, polystyrene, polyethylene, polypropylene, polyethylene terephthalate (PET), polyacrylate, polymethacrylate, poly(vinyl chloride), polyamides, polyaramids, ethylene-vinyl acetate (EVA), polyurethane, thermoplastic polyurethane (TPU), cyanoacrylate, colophony resins, pine resins, photopolymerizable resins or mixtures thereof. Preferentially, the polymer is chosen from polyamides, polycarbonate, polyester, polypropylene, thermoplastic polyurethane and photopolymerizable resins, more preferably from polyamides, polycarbonate, polyester, polypropylene and mixtures thereof.

The fluorescent compound is advantageously provided in a form that is suitable for incorporation into the polymer. Thus, the fluorescent compound may be provided in the form of a powder.

The step of incorporating said fluorescent compound into said polymer consists in obtaining a homogeneous mixture not showing any dispersion. This incorporation step may notably be performed via the methods known to those skilled in the art, for instance extrusion.

The step of obtaining fluorescent fibers from the mixture obtained in the incorporation step may be performed via the techniques conventionally used for producing fibers. Thus, the production may be performed by the melt route. Preferentially, the production step is performed by the melt route via an extrusion-spinning process. An extrusion-melt spinning process may consist first in melting the mixture of polymer and of fluorescent compound in an extruder. The molten material is then passed under pressure through a die constituted of a multitude of heads. At the die outlet, the filaments are air-cooled, drawn and then wound on a support. Generally, a sizing product may be applied to the bottom part of the spinning tower.

During the implementation of the process according to the invention, the amounts are adapted so that the fluorescent compound in the fluorescent fiber advantageously represents amounts ranging from 0.01% to 5% by weight relative to the total weight of the polymer, preferentially amounts ranging from 0.01% to 2% by weight relative to the total weight of the polymer, and even more preferentially amounts ranging from 0.025% to 0.1% by weight relative to the total weight of the polymer.

According to a particular embodiment, the process may also comprise a post-treatment step intended to give the synthetic fluorescent fibers particular properties. Such a post-treatment step may be, for example, a coating treatment, a stain-resistant treatment, a fire-resistant treatment or a finishing step.

Advantageously, the synthetic fluorescent fibers may be used for the manufacture of textiles and of nonwovens. The textiles may notably be obtained by weaving or knitting. A nonwoven is a manufactured product constituted of a gauze, a web, a lap or a mattress of directionally-distributed or randomly-distributed fibers and whose internal cohesion is provided by mechanical, physical or chemical methods or else by a combination of these methods. An example of internal cohesion may be adhesive bonding and results in the production of a nonwoven web, said nonwoven web then being able to be formed into a mat of fibers.

According to this embodiment, the fluorescent fibers may be transformed into a nonwoven according to the techniques known to those skilled in the art, such as the dry route, the melt route, the wet route or flash spinning. By way of example, the formation of the nonwoven via the dry route may notably be performed by calendering or via an aerodynamic (airlaid) process. As regards melt-route production, it may be performed by extrusion (spinbonding technology or spunbonded fabric) or by extrusion-blowing (meltblown).

The synthetic fluorescent fibers thus manufactured find a most particular application in the provision of security to products and notably to fiduciary and/or identity documents, but also to textiles, and also any product which may comprise synthetic fibers.

For example, the synthetic fluorescent fibers will be able to be used for the provision of security to banknotes, passports, identity cards, woven or nonwoven fabrics or any material or product which may comprise fibers, for instance leathercraft articles, carpets or seat coverings.

The synthetic fluorescent fibers according to the invention are thus usable and particularly advantageous for problems of provision of security by means of the fluorescence properties they possess, but not only. Specifically, the fluorescence properties may also be exploited in applications oriented toward decoration and esthetics since said fluorescent fibers may give particular visual properties to the products which comprise them, and notably to textile products, whether they are woven or nonwoven.

A third subject of the invention concerns a process for manufacturing natural fluorescent fibers, comprising the following steps of:
  Providing natural fibers,
  Providing a compound of the 4-bora-3a,4a-diaza-s-indacene family of formula I above,
  Preparing an impregnation solution comprising said compound of the 4-bora-3a,4a-diaza-s-indacene family,
  Impregnating said natural fibers with said soaking solution,
  Recovering the natural fluorescent fibers.

According to this manufacturing process, the natural fibers may be natural fibers known to those skilled in the art, said natural fibers possibly being of plant or animal origin. By way of example, mention will be made notably of cotton, flax and hemp fibers, or alternatively sisal, kenaf or coconut fibers. Preferably, the natural fiber is a cotton fiber.

The step of preparing an impregnation solution consists in preparing a solution so as to be able to impregnate the natural fibers with the fluorescent compound. The impregnation solution may be, for example, a soaking solution or a varnish bath comprising at least one fluorescent compound and which may also comprise a resin. The impregnation solution may be obtained from organic, aqueous or aqueous-alcoholic solutions. By way of example, the solution may be based on ethyl acetate or acetone.

The fluorescent compounds are present in said solution in amounts ranging from 0.01% to 5% by weight relative to the total weight of the solution, preferentially amounts ranging from 0.01% to 2% and even more preferentially in amounts ranging from 0.025% to 0.1% by weight relative to the total weight of the solution.

The impregnation step may be performed, for example, by coating the natural fibers with the impregnation solution prepared beforehand. The coating operation may thus consist in soaking the natural fibers in the impregnation solution for a time which may be between 1 and 10 minutes, preferably for a time of between 2 and 5 minutes.

After the impregnation step, the natural fluorescent fibers thus obtained are recovered and may be left in the open air in order to allow total drying of the impregnation solution.

According to a particular embodiment, the process may also comprise a post-treatment step intended to give the synthetic fluorescent fibers particular properties. Such a post-treatment step may be, for example, a coating treatment, a stain-resistant treatment, a fire-resistant treatment or a finishing step.

According to another particular embodiment, the natural fluorescent fibers may be used for the manufacture of textiles and nonwovens as described previously.

The natural fluorescent fibers thus manufactured have noteworthy fluorescence properties on account of the presence of the compounds of the 4-bora-3a,4a-diaza-s-indacene family according to the invention and find a most particular application in the provision of security to textiles or to any product which may incorporate natural fibers. The natural fluorescent fibers according to the invention are thus particularly advantageous for problems of provision of security by means of the fluorescence properties they possess, but not only. Specifically, the fluorescence properties may also be exploited in applications oriented toward decoration and esthetics since the natural fluorescent fibers give particular visual properties to the products which comprise them, and notably to textile products, independently of whether they are woven or nonwoven.

A fourth subject of the invention concerns the use of fluorescent fibers as described previously for the provision of security to products, and notably for the provision of security to identity documents or fiduciary documents, or to textiles. The fluorescent fibers according to the invention prove to constitute a particularly innovative solution for the provision of security to said products and make it possible notably to obtain level 1 security, which is a true guarantee of rapid and efficient authentication. Specifically, the products will be able to be authenticated by virtue of the unique combination of the absorbed color and of the specific fluorescence of the fluorescent compounds contained in the fluorescent fibers. Thus, only an authentic product will have both the correct absorption and fluorescence emission properties.

Provision of security to the product by means of the use of the fibers according to the invention may be performed at the time of manufacture of said product by adding said fluorescent fibers to the manufacturing process so as to integrate them into the very material of the product. According to an alternative, the provision of security may also be achieved once the product has been manufactured, and, in this case, the fluorescent fibers may, for example, be attached by adhesive bonding onto at least one of the surfaces of said product.

A fifth subject of the invention concerns the use of fluorescent fibers as described previously as a decorative and/or esthetic element in a product. Specifically, by virtue of the fluorescence properties, the fibers according to the invention give improved visual properties to the products incorporating them.

The fluorescent fibers may be added to the product at the time of its manufacture by adding said fluorescent fibers to the manufacturing process so as to integrate them into the very material of the product. For example, in the case of a textile product, the fluorescent fibers may be woven with the fibers of the textile under consideration so as to obtain the desired decorative and/or esthetic appearance.

According to an alternative, the fibers may be added once the product has been manufactured, and, in this case, the fluorescent fibers may, for example, be attached by adhesive bonding onto at least one of the surfaces of said product.

Finally, a sixth subject of the invention concerns a fluorescent fiber comprising a fluorescent compound as defined previously.

A fluorescent fiber according to the invention is a synthetic fluorescent fiber or a natural fluorescent fiber as described previously and may notably be obtained according to the processes also described hereinabove.

The invention will be better understood with the aid of the examples which follow, which are intended to be purely illustrative and do not in any way limit the scope of the protection.

EXAMPLES

Use of a Compound of the 4-Bora-3a,4a-Diaza-s-Indacene Family for the Manufacture of Synthetic Fluorescent Fibers.

For this example, the polymer used is polypropylene and the fluorescent compound chosen is 2,8-diethyl-1,3,5,7-tetramethyl-9-mesitylbipyrromethene difluoroborate of formula: $C_{26}H_{33}BF_2N_2$

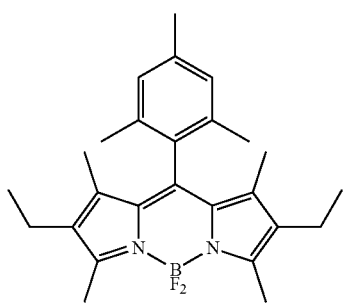

This fluorescent compound absorbs at 526 nm and has a fluorescence emission at 542 nm.

A first mixture is prepared using a powder of fluorescent compound and polypropylene in the form of granules. The mixing is performed by means of a Plasti-Corder® extruder sold by the company Brabender and having the characteristics below:

Screw diameter: 25 mm
Screw length: 40 D
Speed range: 0-150 rpm
Maximum torque: 2×90 Nm
Two filling sections
One degassing section
Extrusion temperature range: 190° C.-230° C.
Extrusion pressure: ambient pressure The amounts of fluorescent compound powder are adjusted so as to obtain an amount of 0.5% by weight in the mixture relative to the total weight of the polypropylene.

At the extruder outlet, polypropylene granules or rods incorporating the fluorescent compound are obtained. Said granules or rods are then introduced into an extruder-spinner machine so as to allow the forming of the actual synthetic fluorescent fibers.

Granules composed solely of polypropylene are also added to the blender of said machine so as to obtain at the extruder-spinner outlet a final amount of fluorescent compound in the fiber of 0.1% by weight relative to the total weight of the polypropylene.

The characteristics of the extruder-spinner are presented below:

Machine model: Spin Boy® (Busschaert Engineering)
5 heating zones (extruder->die: 190° C., 195° C., 200° C., 205° C., 207° C.)
Screw speed: 21 rpm
Spinning pump: 50 rpm
Speed of the first roll: 253 m/minute
Speed of the second roll: 702 m/minute
Speed of the third roll: 15 m/minute At the blender outlet, the molten mixture is forced by means of the metering pump through the die, and fluorescent filaments are obtained. These filaments are then drawn during their cooling by passing over bobbins rotating at increasing speeds before being wound on a bobbin.

After spinning, a fluorescent multifilament bobbin is thus obtained. The bobbin is said to be raw and no twist is imposed on the multifilament at this stage.

The multifilament may then be Z-twisted or S-twisted or combined with other filaments, for instance a contrasting filament.

Since the density of the polypropylene used is 0.95 g/cm³, the linear mass p of the security thread obtained according to this example is 237 dtex.

A spectrophotometric analysis of the synthetic fluorescent fiber obtained shows that the incorporation of the fluorescent compound into the polypropylene does not impair its performance qualities in terms of absorption and fluorescence emission.

The synthetic fluorescent fiber may then be used for the provision of security to a product, an identity or fiduciary document, but also a textile. Said fluorescent fiber may also be used as a decorative and/or esthetic element in a product.

Use of a Compound of the 4-Bora-3a,4a-Diaza-s-Indacene Family for the Manufacture of Natural Fluorescent Fibers.

For this example, the natural fiber is a cotton fiber and the fluorescent compound chosen is 2,8-diethyl-1,3,5,7-tetramethyl-9-mesitylbipyrromethene difluoroborate of formula: $C_{26}H_{33}BF_2N_2$

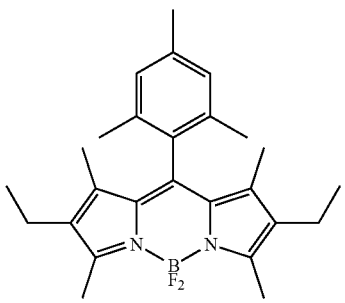

This fluorescent compound absorbs at 526 nm and has a fluorescence emission at 542 nm.

The natural fluorescent fiber is obtained by coating the cotton fiber.

The cotton fiber is immersed for between 2 and 5 minutes in an impregnation solution which is, according to this example, a varnish bath based on ethyl acetate containing 15% of resin and comprising the fluorescent compound, the concentration of which is at 0.1% by weight relative to the total weight of the varnish bath. For the preparation of the impregnation solution, the ethyl acetate may be replaced with acetone.

The natural fiber is then removed and left to dry at room temperature for about 5 minutes to evaporate off the solvent, before it can be wound on a bobbin.

Coating of the natural fiber by soaking may also be performed continuously by passing the unwound natural fiber into a soaking bath, according to the terms of a person skilled in the art. The thickness of the coating layer then depends mainly on the immersion time and on the outlet speed of the fiber.

A spectrophotometric analysis of the natural fluorescent fiber obtained shows that the impregnation of the fluorescent compound into the fiber does not impair its performance qualities in terms of absorption and fluorescence emission.

The natural fluorescent fiber may then be used for the provision of security to a product, a fiduciary or identity document, but also a textile. Said fluorescent fiber may also be used as a decorative and/or esthetic element in a product.

The invention claimed is:

1. A process for manufacturing synthetic fluorescent fibers, comprising the following steps of:
   providing a polymer,
   providing a compound of the 4-bora-3a,4a-diaza-s-indacene family being chosen from those of formula I:

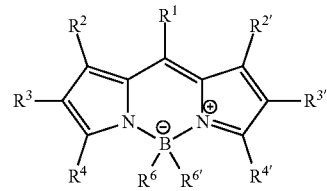

wherein:
$R^1$ is phenyl, said phenyl group being substituted with one or more groups chosen from C1 to C2 alkyl, hydroxyl, $R^5COO^-$ and halogen;
$R^2$ and $R^{2'}$ are independently chosen from hydrogen and C1 to C2 alkyl;
$R^3$ and $R^{3'}$ are independently chosen from hydrogen, aryl, heteroaryl, cycloalkyl, alkyl, alkenyl and alkynyl, said aryl, heteroaryl, cycloalkyl, alkyl, alkenyl and alkynyl being optionally substituted with one or more groups chosen from C1 to C4 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;
$R^4$ and $R^{4'}$ are independently chosen from aryl, heteroaryl, cycloalkyl, alkyl, alkenyl and alkynyl, said aryl, heteroaryl, cycloalkyl, alkyl and alkenyl being optionally substituted with one or more groups chosen from C1 to C3 alkyl, aryl, hydroxyl and ferrocene, said aryl group being optionally substituted with one or more groups chosen from aryl, C1 to C2 alkyl, halogen, hydroxyl, dimethylamino, nitro, said aryl being optionally substituted with a C1 to C2 alkyl group;
$R^5$ is C1 to C4 alkyl or C2 to C4 alkenyl;
$R^6$ and $R^{6'}$ are independently chosen from halogens, C1 to C4 alkyl, C2 to C4 alkynyl, C2 to C4 alkenyl or aryl, said aryl being optionally substituted with one or more groups chosen from C1 to C2 alkyl, hydroxyl, $R^5COO-$ and halogen, incorporating said compound into said polymer so as to obtain a homogeneous mixture, obtaining synthetic fluorescent fibers from the homogeneous mixture obtained in the incorporation step,
the fluorescent compound in the fluorescent fiber represents amounts ranging from 0.01% to 5% by weight relative to the total weight of the polymer.

2. The manufacturing process as claimed in claim 1, wherein the polymer is chosen from polycarbonate, polyester, polypropylene, polyamides and mixtures thereof.

3. The manufacturing process as claimed in claim 1, wherein the incorporation step is performed by extrusion.

4. The manufacturing process as claimed in claim 1, wherein the step of producing the synthetic fluorescent fibers is performed via the melt route.

* * * * *